United States Patent
Michot et al.

(10) Patent No.: US 6,598,792 B1
(45) Date of Patent: Jul. 29, 2003

(54) METHOD FOR CONTROLLING THE SUPPLY OF FUEL AND/OR THE PAYMENT FOR SAME AT A SERVICE STATION AND INSTALLATION USED FOR IMPLEMENTING THIS METHOD

(75) Inventors: Gérard Michot, Dampierre (FR); Jacques Legoux, Savigny (FR)

(73) Assignee: ORDICAM Recherche et Development (FR)

( * ) Notice: Subject to any disclaimer, the term of this patent is extended or adjusted under 35 U.S.C. 154(b) by 0 days.

(21) Appl. No.: 09/529,229
(22) PCT Filed: Jun. 19, 1997
(86) PCT No.: PCT/FR97/01101
§ 371 (c)(1),
(2), (4) Date: Aug. 17, 2000
(87) PCT Pub. No.: WO98/00817
PCT Pub. Date: Jan. 8, 1998

(30) Foreign Application Priority Data

Jun. 28, 1998 (FR) .............................................. 96 08201

(51) Int. Cl.⁷ .............................................. G06F 17/60
(52) U.S. Cl. ...................................... 235/384; 235/382
(58) Field of Search ................................ 235/384, 382, 235/385

(56) References Cited

U.S. PATENT DOCUMENTS

| 4,263,945 A | * | 4/1981 | Van Ness ................ 137/234.6 |
| 4,345,146 A | * | 8/1982 | Story et al. .................. 235/381 |
| 4,469,149 A | * | 9/1984 | Walkey et al. .............. 141/346 |
| 4,846,223 A | * | 7/1989 | Humbert, Jr. ............... 137/588 |
| 4,934,419 A | * | 6/1990 | Lamont et al. ......... 141/311 R |
| 5,249,612 A | * | 10/1993 | Parks et al. .................. 141/219 |
| 5,605,182 A | * | 2/1997 | Oberrecht et al. .......... 141/231 |
| 5,902,985 A | * | 5/1999 | Bos et al. .................... 235/384 |
| 5,913,180 A | * | 6/1999 | Ryan .......................... 235/375 |
| 5,923,572 A | * | 7/1999 | Pollock ........................ 141/94 |
| 6,062,473 A | * | 5/2000 | Blalock et al. .............. 235/381 |
| 6,085,805 A | * | 7/2000 | Bates .......................... 141/192 |
| 6,158,655 A | * | 12/2000 | DeVries et al. ............. 235/380 |
| 6,213,393 B1 | * | 4/2001 | Streicher et al. .............. 141/94 |
| 6,374,870 B1 | * | 4/2002 | Muller ....................... 141/198 |
| 6,420,961 B1 | * | 7/2002 | Bates et al. ................. 141/231 |

FOREIGN PATENT DOCUMENTS

WO          WO 37355 A1   *  6/2000

* cited by examiner

*Primary Examiner*—Karl D. Frech
*Assistant Examiner*—Daniel I Walsh
(74) *Attorney, Agent, or Firm*—William A. Drucker

(57) ABSTRACT

The device for implementing the method consists in a receiving unit at the station, associated with a computer managing the dispensing nozzles, a terminal associated with a pump controller and linked to the receiving unit and an identifying module associated with each of the nozzles and also on the vehicle, a device for reading the modules provided in the inlet of the fuel tank, a processor for typing out messages including data from the reading device as well as other data and a transmitter/receiver to transmit the messages to the receiver of the receiving unit. The invention is applicable particularly to the supply of fuel to vehicles of road transport companies.

6 Claims, 1 Drawing Sheet

METHOD FOR CONTROLLING THE SUPPLY OF FUEL AND/OR THE PAYMENT FOR SAME AT A SERVICE STATION AND INSTALLATION USED FOR IMPLEMENTING THIS METHOD

BACKGROUND OF THE INVENTION

1. Field of the Invention

The present invention concerns a method to control the supply of fuel and/or the payment for same at a service station and the installation used implementing these method.

It applies more particularly, but not exclusively, to the supply of fuel to vehicles belonging to road transport companies and which carry out long period rotations (for example several weeks) outside their base.

2. Description of the Prior Art

In fact, in this case the management of fuel charges becomes difficult to be ensured by the accounting departments which only receive the invoices on the return of lorries, provided the drivers have carefully retained said invoices.

This is why road transport companies conclude agreements with fuel companies so as to ensure that the amounts relating to the quantities delivered are centralised at the fuel company and billed by the latter to the transport company, the driver only having to provide the identification elements (for example by means of an identification card), a simple plastic support sometimes associated with a magnetic track) giving proof to the service station that he is authorised to take fuel to be deducted from the account of the company.

However, despite its advantages, this solution does have a large number of drawbacks, mainly due to it being impossible to carry out sufficient controls to eliminate fraud.

Thus, for example, the holder of an identification card could use his card to fill a private vehicle not belonging to the company.

Similarly, the inspection carried out by an operator present at the service station only occurs at the station exit, that is once the vehicle has been filled up its tank with fuel. Then it is difficult to effectively intervene if the identification code appearing on the card of the driver is on a black list.

So as to eliminate these drawbacks, an attempt has been made to fit the computers associated with the various pump groups with a reading unit connected to a pump controller, normally situated in the shop of the station, this controller then being programmed so as to carry out the required checks before authorising the pump to distribute the fuel.

However, this solution proves to be less effective since it does not automatically input the data relating to the vehicle.

In addition, this solution guarantees that once the authority is obtained, the user fills the tank of the lorry of the concern in question and not any other tank or receptacle.

OBJECT OF THE INVENTION

The object of the invention is thus to eliminate these drawbacks.

SUMMARY OF THE INVENTION

To this effect, it concerns providing a control and/or payment method including:

prior to filling the tank by means of a distribution gun associated with a computer, the inputting by a receiving unit associated with said computer with identification data relating to the driver and/or the transport company and the transmission to a terminal associated with the pump controller of this identification data and data specific to the computer, in particular its number and thus its localisation, checking by the pump controller or terminal that no element preventing delivery of fuel, this check being made by comparing identification data with the data held by the pump controller or terminal, in particular the black list, then the controller orders the computer, initially in the free service mode, to go into the system mode, as soon as the pump gun is introduced into the tank, the reading by an electronic system situated on the edge of the vehicle with an identification number contained in an identification module associated with the gun then the transmission by this system intended for said receiving unit of messages including the identification number, information concerning the payer and possibly the identification data of authorised drivers and the length in kilometres of the vehicle, said receiving unit transmitting these messages to the controller by means of said terminal and authorising the computer to start distribution, the halting of distribution when ordered by the computer when the latter is advised by the receiving unit to stop reading said identification module indicating a removal of the gun outside the tank, the end of the transaction subsequent to the gun being placed back onto the pump which triggers the transfer by the computer for the controller and the terminal of information relating to the volume of fuel delivered and the amount to be paid, that is information which can be retransmitted to the payer by the terminal.

Advantageously, the inputting of identification data relating to the driver and/or the transport company could be made by means of an information support smart card held by the driver and a card reader associated with the issuer/receiver.

Similarly, the identification data support of the gun could include a memory integrated circuit associated with a coil and the reading of this support by the embarked electronic system could be provided by a reader including a coil located at the opening of the tank of the vehicle and close to the coil of the identification data support when the gun is inserted inside the tank.

BRIEF DESCRIPTION OF THE DRAWINGS

A mode of execution of an installation for implementing the method of the invention shall be described hereafter and given by way of non-restrictive example with reference to the accompanying drawings on which.

DESCRIPTION OF THE PREFERRED EMBODIMENTS

Figure 1:
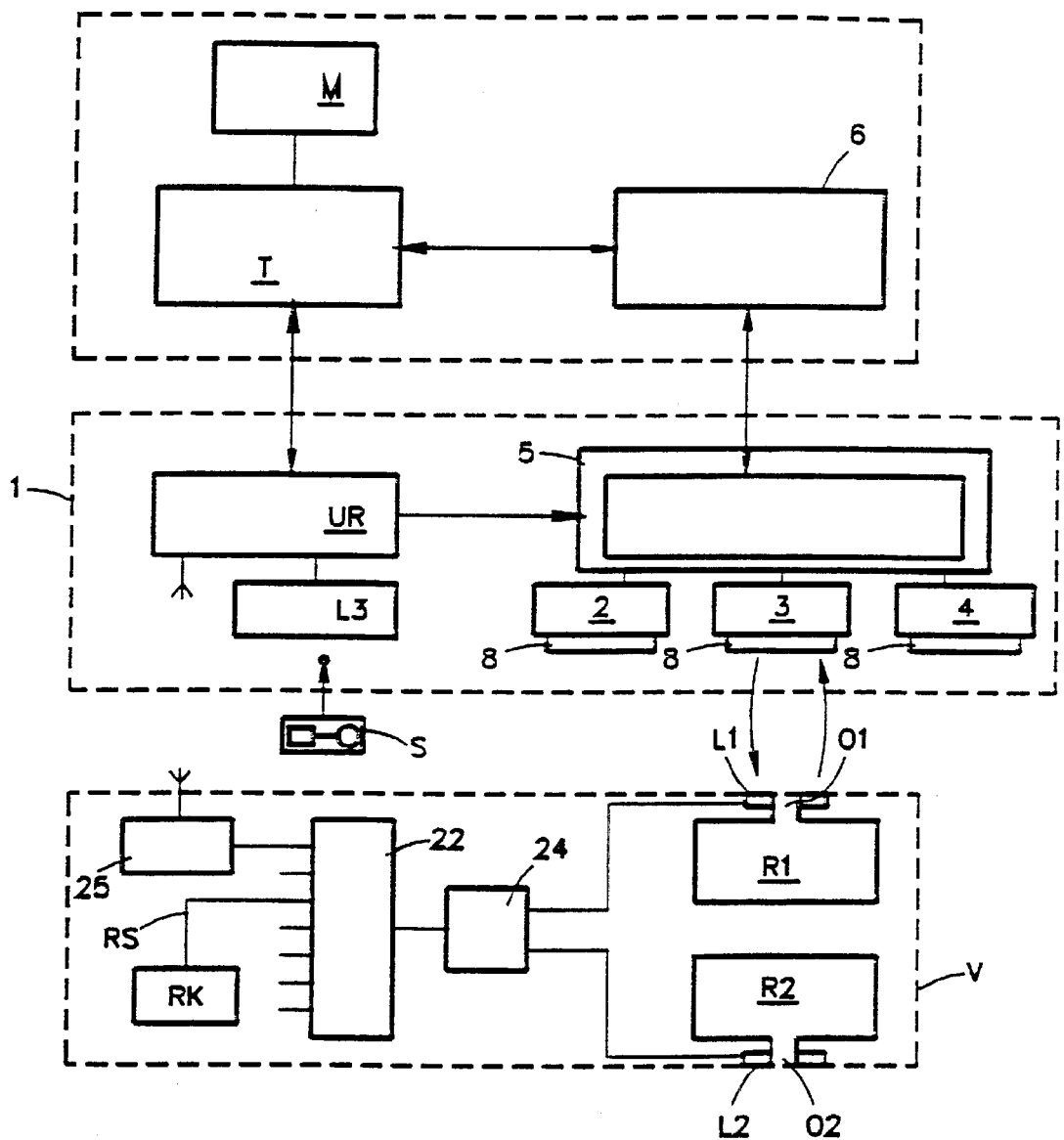
FIG. 1 is a diagrammatic representation illustrating the principle of the method of the invention.

In the example shown on FIG. 1, the service station conventionally includes a distribution station (block 1) comprising a series of three fuel distribution pumps 2, 3 and 4 controlled by a computer 5 which in particular displays the quantities of fuel delivered, as well as the corresponding amount to be paid and which transmits this information to a pump controller 6.

The computer 5 decides on distribution of the fuel. Normally, it is in the "free service" mode, but can change to the "system" mode after the execution of a procedure. This is normally the case for fuel distribution in the mode for payment by credit card.

The pump controller 6 consists of an electronic system located in the station, for example at a monitoring terminal or at the station goods cash desk. The payment terminal and the system terminal T are connected to this controller 6.

In this example, shown by the broken lines of a block, is a vehicle V parked in front of the distribution terminal 1. This vehicle V, which may consist of a lorry, includes two tanks $R_1$ and $R_2$ accessible by two openings $O_1$ and $O_2$ which respectively open on its two lateral sides.

Figure 2:
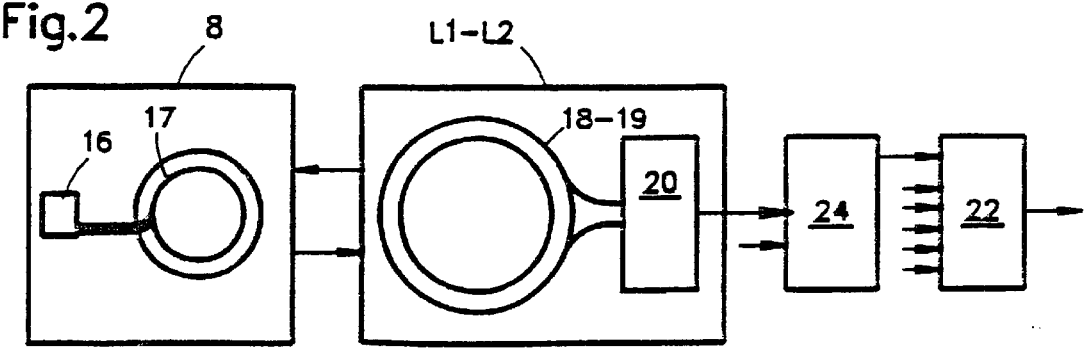
FIG. 2 is the diagram of a transmission device without any usable contact for identification of the volume counter.

In accordance with the invention, each of these openings $O_1$ and $O_2$ is equipped with a no contact reading device $L_1$ and $L_2$ including, as shown on FIG. 2, a coil 18, 19 able to read the identification codes stored in identification modules 8 each equipping guns 2, 3 and 4. These no contact reading/writing identification modules 8 include for example a small integrated circuit 16 connected to a coil 17, this unit being coated with a substance adapted for this usage, such as ABS, PS, glass, epoxy, etc.

The integrated circuit 16 may include a read-only untransferable memory originally programmed at the time it was produced so as to be able to issue a coded identification signal. However, this memory 16 could be downloadable (or reprogrammable) with the aid of suitable means. The electric energy required for functioning of the integrated circuit is transmitted by the induction coil 18 and received by the coil 17 associated with the circuit 16. The induction coil 18 is used during reading to transmit the energy to the coil 16 and recover the identification signal transmitted by the circuit/coil pairing (16 and 17). The identification code used by this signal may have twelve figures. In this case, there are several billions of possible combinations.

As soon as the identification module 8 enters the field of the induction coil 18, 19 of a reading device $L_1$, $L_2$ of the type of those equipping the openings 10, 11 of the tanks $R_1$ and $R_2$, the integrated circuit 16 is reactivated. Using the energy sent to it by the coil 18, 19, it continuously transmits its code in the form of a modulation of the current circulating in the coil 17. This modulation is then captured by the coil 18, 19 of the reading device $L_1$, $L_2$ and then processed by an analog circuit 20. The processed signal is then transmitted to a central processor 22 of the vehicle V. This processor 22 shapes the signal so as to extract from it the identification number.

The identification module 8 could preferably have an annular shape and be placed coaxially to the joining piece of the gun 2, 3, 4, the coil 18, 19 of the reading device $L_1$, $L_2$ being disposed coaxially to the opening $O_1$ and $O_2$ of the tank $R_1$ and $R_2$. By means of this disposition, when the gun 2, 3, 4 is in the engaged position in the opening $O_1$ and $O_2$ of the tank $R_1$ and $R_2$, the two coils 17, 18–19 are disposed coaxially (and thus parallel) in relation to each other and a short distance away from each other. Thus, a good mutual induction factor is obtained and also a good transfer of energy from the reading device $L_1$, $L_2$ to the identification module 8 and a good transmission of information from the module 8 to the reading device $L_1$, $L_2$.

In this example, the information delivered by the reading devices $L_1$, $L_2$ are transmitted via the analog circuit 20 by means of a multiplexer 24 to the central processor 22 whose memory may contain a plurality of information, such as the identification information of persons authorised to take fuel from the vehicle of the transport company, as well as other information possibly concerning the distance covered in kilometres, the fuel level, technical controls, etc.

The information relating to the distance covered in kilometres are supplied by a kilometering recovery element RK connected to the tachymeter of the vehicle and which is connected to the processor 22 by means of a standard RS 232 or RS 485 link.

On the basis of this information, the processor draws up a signal S which is applied to a receiving transmitter HF 25.

The computer 5 is also connected to a receiving unit UR including firstly a receiver/transmitter HF tuned to the transmitter/receiver 25 of the vehicle V, and secondly a reading device $L_3$ of an identification support S possibly appearing in the form of a no-contact reading and/or writing smart card. This card may include a structure similar to that of the identification module 8.

The receiving unit UR is connected to a terminal T physically situated in the service station at a location close to the pump controller 6 to which it is connected by a bidirectional wire link.

The functioning of the system described earlier is thus the following:

In accordance with the method of the invention, during a phase prior to fuel distribution, the system shall identify the driver and/or the carrier and/or the vehicle V and check the credentials of the driver authorising him to take fuel to charged to the account of his company.

To this effect, the driver shall submit his identification support S opposite the reading device $L_3$ for a no-contact reading of the identification data stored in the support. The information read by the reading device $L_3$ can be of two types, namely:

information relating to a specific application code identical on all cards, such as an 8 bit code, an identification number of the driver (for example 40 bits) for which unicity is guaranteed, the registration number of the vehicle and possibly a number identifying the carrier (a card authorising a reading/writing is then required).

The information read by the reading device $L_3$ is transmitted by a bi-directional wire link or by the transmitter/receiver associated with the receiving unit UR to the terminal T so that the controller 6 knows from which computer it concerns and acts on this computer 5 so to make it go from the "free service" mode in which it is situated into a "system" mode for implementing the method of the invention.

During this transmission, the terminal T can carry out a search to check that the identification number of the driver and/or of the carrier is not on a black list and that nothing prevents fuel being delivered (principle identical to that used for credit cards).

If the search is positive, the terminal T gives the go-ahead to the controller 6 and informs it of the number of the computer 5 concerned. The controller 6 then acts on the corresponding computer 5 so as to make it go from the free service mode into the system mode. The guns 2, 3, 4 under the control of this computer can then no longer be used in the free service mode.

If the search is negative, the terminal T informs the receiving unit UR of its refusal to deliver fuel to the driver or carrier (sound or visual signal).

The next phase of the method consists of recognising the vehicle V and the computer 5.

This phase is acquired by one of the guns 2, 3, 4 being engaged in the tank $R_1$ and $R_2$ of the vehicle V which produces a coupling between the coil 18–19 of the reading device $L_1$–$L_2$ and the coil 17 of the identification module 8.

The identification data read by the reading device $L_1$–$L_2$ are processed by the central processor 22 of the vehicle V which draws up a message which may include, in addition to the identification number of the computer 5 and the identification number of the gun, information previously stored by the carrier, such as the registration number of the vehicle V, the numbers of the cards of drivers authorised to drive the vehicle and possibly information relating to the company, such as the telephone number, the fax number to which the transaction report is to be sent, and the distance covered in kilometres of the vehicle provided by the kilometering recovery circuit RK associated with the tachymeter.

These messages are transmitted by the transmitter/receiver 25 to the transmitter/receiver of the receiving unit UR.

As soon as the processor 22 has given the transmitter/receiver 25 the information to be transmitted, this information is sent to the transmitter/receiver of the receiving unit UR which acknowledges by informing via radio the processor 22 that it has clearly understood the message. If this is not the case, the processor 22 re-issues the message. Following acknowledgement, the transmissions are interrupted, unless the gun 2, 3, 4 is withdrawn from the tank $R_1$ and $R_2$ and thus unless the identification module 8 is no longer read.

In this case, the processor 22 immediately sends the number of the gun 2, 3, 4 to the receiving unit UR which acts via the wire link on the computer 5 so as to stop distribution.

This choice of only transmitting when withdrawing the gun is dictated by the desire to save the energy of the vehicle and more particularly not to saturate the waves by the continuous emissions of several vehicles.

In fact, throughout the operational phase, the central processor 22 periodically checks, such as twenty-five times per second, the presence of the gun 2, 3, 4 in the tank $R_1$ and $R_2$. Following a predetermined number of absence of reading, the processor 22 draws up an order for halting distribution transmitted by radio (transmitter/receiver 25) to the computer 5 which halted distribution. An extremely short response time is obtained between the moment when stopping of reading of the identification number and the halting of distribution occurs.

If reading of the identification number is resumed, a marking time makes it possible to resume fuel distribution without having to restart the entire sequence.

The distribution of fuel under the control of the system ends when the gun 2, 3, 4 is placed back. The computer 5 then returns under the control of the station operator who could put the system back into free service once the transaction has been paid for.

At the same time, the hanging up of the gun 2, 3, 4 signifies the end of the transaction. The computer 5 then sends the pump controller 6 information concerning the volume of fuel delivered and the amount to be paid. The controller 6 possibly sends details of this information to the terminal T which transmits it by modem M or by any other suitable means to the concerns involved.

One significant advantage of said system consists of the fact that it enables several vehicles to be filled simultaneously on a given station in the system mode in accordance with the method of the invention.

This is due to the fact that, so as to be taken into consideration by a computer 5, a message transmitted by the transmitter/receiver 25 of the vehicle V shall include the identification number of one of the guns under the control of this computer 5.

To this effect, the receiving units UR all have stored the identification numbers of their guns.

When they receive a message, these receiving units UR firstly check that this message is intended for them by carrying out a control concerning the identification number of the gun 2, 3, 4. They only act on the computer 5 or terminal T if they are concerned. By means of these dispositions, the system is able to function with several computers.

What is claimed is:

1. Method for controlling supply of fuel in a thank of a vehicle having a driver at a service station provided with at least a distribution station comprising a set of distribution guns associated with a computer coupled to a receiving unit and connected to a pump controller having a conventional free service mode and a system mode wherein said guns are under control of said computer and cannot be used in said conventional free service mode, said pump controller being connected to a system terminal by a bidirectional link, said receiving unit being connected to a reading and/or writing device for a smart card owned by said driver and said guns each comprising an identification module which can be read without contact by an in-board electronic system provided in said vehicle which comprises transmitting means tuned to said receiving unit, said method having a sequence comprising a first step of reading identification data contained in said smart card by said reading device with identification of said driver and/or said vehicle by said distribution station from said identification data, a second step of transmitting said identification data to said terminal through said bidirectional line in order to send to said pump controller and information about said computer and to act on said computer to pass from said free service mode to said system mode, a third step of recognized said vehicle and said computer, said third step comprising an engagement of said gun in said tank which provokes reading of identification information contained in said identification module and generating of a message comprising said identification information, information about said computer and information previously stored in said in-board electronic system about said vehicle and about drivers habilitated to drive said vehicle, a fourth step of transmitting periodically said message to the receiving unit only when said in-board electronic system is reading said identification information, a fifth step of ending the periodic transmission of messages when the step of reading said identification information is stopped, a sixth step wherein following to detection of an absence of messages the receiving unit acts on the computer to stop supply of fuel and to restaure this supply when the message are again received by the receiving unit, a seventh step wherein when the fun is placed back the computer returns under the control of a station operator and the pump controller returns to the free service mode upon payment of the fuel delivered by the gun.

2. Method according to claim 1, wherein said in-board communication system communicates with said receiving unit by radio transmission.

3. Method according to claim 1, wherein the identification module is a standard no-contact reading and/or writing device and includes a storage integrated circuit connected to a coil used for both transferring the energy needed for its functioning and for the transmission of information.

4. Method according to claim 3, wherein said in-board electronic system comprises a coil placed at the level of an opening in the tank at a location close to the coil of the identification module when the gun is engaged in the tank, so as to read said identification module.

5. Method according claim 1, wherein so as to be taken into consideration by said computer, the message transmitting by a transmitter/receiver of the vehicle includes an identification number of one of the guns under the control of said computer.

6. Device for controlling the supply of fuel in a tank of a vehicle in a service station comprising at least a distribution station comprising a set of distribution pumps controlled by a computer comprising means for display information about quantities of fuel delivered an a corresponding amount to be paid and means for transmitting said information to a pump controller provided with means for controlling said supply of fuel and means for passing from a "free service mode" to a "system mode" said pump controller being distant from said distribution station, and being connected to a payment terminal and a system terminal, said computer being also connected to a receiving unit which is located in the service station near of the pump controller and which is connected by a bidirectional link to a device for reading without contact an identification supported owned by driver of said vehicle each of said distribution pump having a gun equipped with an identification module provided with a first coil extending coaxially to the gun to as to be read by a reading device equipping an in-board electronic system of the vehicle said reading system having a reading coil disposed coaxially to an opening of the tank so that when said gun is engaged in said opening said coils are disposed coaxially in relation to each other and a information can be obtained between said identification module and said reading device, said in-board electronic system further having means for generating and for transmitting to said receiving station message when said reading device is reading said identification module.

* * * * *